United States Patent [19]

Schill

[11] Patent Number: 4,920,875
[45] Date of Patent: May 1, 1990

[54] MACHINE FOR SKINNING OR SLICING BACON OR THE LIKE

[75] Inventor: Hermann Schill, Kehl, Fed. Rep. of Germany

[73] Assignee: Maja-Maschinenfabrik Herman Schill GmbH, Kehl-Goldscheuer, Fed. Rep. of Germany

[21] Appl. No.: 245,009

[22] Filed: Sep. 15, 1988

[30] Foreign Application Priority Data

Sep. 17, 1987 [DE] Fed. Rep. of Germany ....... 3731201

[51] Int. Cl.$^5$ ............................................. A22C 17/12
[52] U.S. Cl. ............................................ 99/589; 17/21; 17/62; 99/595; 99/599
[58] Field of Search ................. 99/485, 486, 537, 538, 99/539, 540, 584, 589–591, 588, 489–492; 83/870, 871, 873; 17/1, 21, 62

[56] References Cited

U.S. PATENT DOCUMENTS

| 3,559,707 | 2/1971 | Townsend | 99/589 |
| 4,123,959 | 11/1978 | Schill | 83/874 |
| 4,188,870 | 2/1980 | Schill | 99/589 |
| 4,203,179 | 5/1980 | Braeger | 99/589 |
| 4,250,594 | 2/1981 | Mitchell | 17/62 |
| 4,408,519 | 10/1983 | Schill | 99/486 |
| 4,423,671 | 1/1984 | Murphy | 99/590 |
| 4,466,344 | 8/1984 | Schill | 17/21 |

FOREIGN PATENT DOCUMENTS

| 1278873 | 5/1969 | Fed. Rep. of Germany . |
| 1293635 | 12/1969 | Fed. Rep. of Germany . |
| 3213730 | 10/1983 | Fed. Rep. of Germany . |

Primary Examiner—Timothy F. Simone
Attorney, Agent, or Firm—Peter K. Kontler

[57] ABSTRACT

A bacon slicing or skinning machine has a housing for a set of conveyors including a traction wheel located beneath an elongated path for the products which are to be skinned or sliced. A blade holder is pivotably mounted at a level above the path adjacent the traction wheel on the heads of two independently movable arms which flank the path and carry a pivot bearing for the holder. The bearing is located in front of a device which limits the extent of movement of the holder and its blade from a starting position to a working position in response to engagement of the cutting edge of the blade by an oncoming product. Such device can comprise a pintle which extends with play into recesses of the arms, or an eccentric on at least one of the arms, such eccentric being tracked by a rearwardly extending follower of the holder. Springs are provided to permanently pull the arms downwardly so as to urge the holder to the starting position. The blade is inclined rearwardly and downwardly so that it is tilted by the oncoming product to thereby cause the holder to pivot about the axis of the bearing and to assume its working position.

48 Claims, 9 Drawing Sheets

MACHINE FOR SKINNING OR SLICING BACON OR THE LIKE

BACKGROUND OF THE INVENTION

The invention relates to improvements in machines for slicing pieces of meat or the like, especially to improvements in machines for skinning (derinding) or slicing bacon.

A bacon skinning or slicing machine normally comprises a so-called traction wheel which advances the product to be skinned or sliced against the cutting edge of a blade. The blade is mounted in a holder which is preferably adjustable so as to select the thickness of the slices or slabs which are being severed from the product. In many instances, the holder for the blade constitutes a balance beam which is tiltable in the machine housing or frame about an axis located at a level above the blade. As a rule, the blade is movable between a first position which it assumes during the initial stage of a slicing or skinning operation, and a so-called working position. The blade changes its position in response to engagement with the product, and its holder is normally mounted in a support which is provided with a bearing for the holder. Machines of such character can be used for the slicing or skinning of bacon, for removing skin from meat, for removing skin from fish and for similar purposes. In most instances, such machines are used for cutting slabs of bacon into slices and/or for removing skins or rinds from slabs of bacon.

Common owned German Pat. No. 1 278 873 to Schill discloses a bacon skinning machine which is provided with automatic blade orienting means, i.e., the orientation of the blade relative to the traction wheel changes as a function of characteristics of the product which is being treated in the machine. The arrangement is such that the blade is initially maintained in a position close to the traction wheel and is thereupon shifted by the product in the direction of advancement of the product through the machine. This causes a lifting of the cutting edge of the blade above and away from the periphery of the traction wheel so that the distance between the traction wheel and the blade increases. Such mode of operation is proposed in order to ensure that the cutting edge of the blade will move away from the relatively hard layer of bacon in close proximity to the rind and will begin to sever a softer layer which is located at a somewhat greater distance form the rind. One or more springs can be employed to pull the support for the holder in a direction to move the cutting edge of the blade nearer to the traction wheel. The spring or springs are designed to overcome the relatively low resistance of a softer layer or softer layers of the product to the penetration of the cutting edge of the blade thereinto. Such spring or springs are designed to urge the blade substantially to or close to the starting position in conformance to the thickness of the rind.

The just described machine operates satisfactorily if successively treated products (such as slabs of bacon) exhibit identical or very similar characteristics, particularly as concerns the hardness of material which is to be severed during transport through the machine. However, the operation of such machines is less reliable if a relatively soft slab of bacon is followed by a thoroughly aged slab which is much harder as a result of prolonged curing and/or storage. This will be readily appreciated since the extent of changes of orientation of the blade relative to the traction wheel during severing of a relatively soft slab of bacon is quite different from the extent of changes of orientation if the machine is called upon to skin a relatively hard product. In addition, and since the blade must move first from a starting position to the working position and thereupon back to the starting position, the length of that portion of the rind which is removed during the initial stage of the skinning or derinding operation (i.e., while the blade is in the process of assuming and remaining in its optimum position) is too long.

Commonly owned German Pat. No. 1 293 635 to MAJA discloses a skinning machine wherein the blade holder is confined to movements relative to a guide which causes the cutting edge of the blade to advance along an arcuate path. The curvature of the path resembles that of the peripheral surface of the traction wheel and is such that the cutting edge of the blade gradually approaches the traction wheel. A drawback of this machine is that the length of the initially severed portion of the skin, i.e., of the portion which is removed while the blade is in the process of moving toward its final position relative to the traction wheel, is still too long. Moreover, the machine of MAJA is not provided with any means for adjusting the holder for the blade in dependency upon variations of thickness of the skin or rind on a slab of bacon which is being advanced through the machine, i.e., toward and into the range of and thereupon by the rotating traction wheel.

Published German patent application No. 32 13 730 of Weber discloses a slicing or skinning machine wherein the position of the blade relative to the traction wheel varies as a function of changes in the force which is necessary to rotate the traction wheel, i.e., in dependency on the magnitude of resistance which the product offers to the slicing or skinning action. The position of the blade can be changed by pneumatic or electrical means. Such machines are overly sensitive and hence prone to malfunction, especially when used for the skinning or slicing of slabs of varying hardnesses and when manipulated by semiskilled or unskilled persons. Moreover, the cost of control means is high and the energy requirements of the machine are excessive.

Further presently known machines for slicing and/or skinning bacon or other edible products are disclosed in commonly owned U.S. Pats. Nos. 4,123,959, 4,188,870, 4,408,519 and 4,466,344, all granted to Schill. U.S. Pat. No. 4,466,344 discloses a machine wherein the blade is movable with reference to the traction wheel by a support having two arms which carry the holder for the blade. The support can be moved between a position in which the blade and the holder can be detached from the support, a starting position, and to a position in which the blade automatically conforms its position to the thickness of the rind on a slab of bacon. The disclosures of all four patents to Schill are incorporated herein by reference.

OBJECTS OF THE INVENTION

An object of the invention is to provide a machine for slicing or skinning bacon or other edible products wherein the blade can be rapidly moved to a optimum position for the severing of a product which is conveyed through the machine.

Another object of the invention is to provide a machine whose operation is less dependent upon the characteristics of treated products than the operation of presently known machines.

A further object of the invention is to provide a relatively simple and inexpensive but highly versatile machine for slicing or skinning slabs of bacon, pieces of meat, fish and like products.

An additional object of the invention is to provide the machine with novel and improved means for changing and selecting the position of the blade with reference to the traction wheel.

Still another object of the invention is to provide a sturdy, reliable and compact slicing or skinning machine and to provide such machine with novel and improved means for automatically and/or intentionally altering the distance between the cutting edge of the blade or knife and the periphery of the traction wheel.

A further object of the invention is to provide improvements in slicing or skinning machines wherein the position of the blade relative to the traction wheel can be altered by the product which is in the process of being skinned or sliced.

Another object of the invention is to provide a novel and improved method of regulating the distance between the cutting edge of a bacon slicing or skinning knife or blade and the mechanism which transports slabs of bacon or the like through the machine.

SUMMARY OF THE INVENTION

The invention is embodied in a machine for slicing and/or skinning slabs of bacon and like products. The machine comprises a housing or frame, means for advancing products in the housing in a predetermined direction and along a predetermined path including a traction member at one side of the path, a blade holder at the other side of the path, a blade which is preferably removably installed in the holder and has a cutting edge adjacent the traction member, a bearing which pivotably mounts the holder for movement of the cutting edge nearer to and further away from the traction member, means for yieldably urging the holder to a predetermined starting position in which the cutting edge of the blade is located at a predetermined distance from the traction member and from which the holder is movable as a result of engagement of the cutting edge by the products in the predetermined path, and means for limiting the extent of movability of the holder from the starting position to a working position. The blade is preferably inclined with reference to the path in he starting position of the holder, and the limiting means is preferably spaced apart form the bearing. As a rule, the holder will be located at a level above the path for the products (such path may be a substantially horizontal path), and the blade is then inclined downwardly counter to the predetermined direction.

The urging means comprises a support for the bearing and means for biasing the support in a second direction transversely of the predetermined direction so as to urge the cutting edge nearer to the traction member. Stop means can be provided to confine the support to movements in the second direction. Means can be provided for adjusting the bias of the biasing means upon the support.

The bearing can comprise at least one aperture which is provided in the support, which extends in the predetermined direction and which has a closed front end (as seen in the predetermined direction), and at least one pintle which is provided on the holder and extends into the aperture transversely of the predetermined direction. The aperture can constitute a recess which has an open rear end.

The limiting means can comprise at least one aperture which is provided in the support for the holder and its bearing, which extends in the predetermined direction and which has a closed front end (as seen in the predetermined direction), and at least one pintle which is provided on the holder and extends into the aperture transversely of the predetermined direction. Such aperture can also constitute a recess which has an open rear end.

The bearing can be disposed ahead of the limiting means (as seen in the predetermined direction).

The support preferably comprises two arms which flank the predetermined path. The aforementioned stop means can serve to confine the arms to movements substantially transversely of the predetermined direction, i.e., to prevent any or to permit only limited movements of the arms in and counter to the predetermined direction. Such stops can include at least one first stop on the traction member and at lest one second step which can be provided in the housing opposite or substantially opposite the first stop. The traction member can include or constitute a wheel, and the first stop can include one or more rings on the wheel. The arms of the support for the holder are located behind the wheel, as seen in the predetermined direction. Portions of the aforementioned bearing and limiting means (namely the aforementioned apertures for the pintles of the bearing and limiting means) are preferably provided in the upper end portions or heads of the arms which form part of or constitute the support for the holder.

As mentioned above, the blade preferably slopes rearwardly and downwardly toward the path for the products, and the inclination of such blade relative to the path can be in the range of 5 to 20 degrees, preferably approximately 12 degrees. The machine can further comprise means for altering the inclination of the blade relative to the path, at least in the working position of the holder. Such inclination altering means can comprise means for moving the support for the holder relative to the housing so as to move the holder in the circumferential direction of the traction wheel. The means for moving the support can include one or more links or other suitable entraining means which is coupled to the support, and means for moving the entraining means relative to the housing between a plurality of different positions. The last named moving means can comprise a bell crank lever which is articulately connected to the entraining means, and one or more rotary knobs or other suitable means for pivoting the lever or levers with reference to the housing. The link or links of the entraining means can move the holder by way of the limiting means. For example, each link can include a first or front end portion which is in engagement with the pintle of the limiting means, and a second or rear end portion which is operatively connected (by a pivot member or the like) to the bell crank lever of the means for moving the entraining means. The first or front end portion of the link can be provided with a suitably configurated socket or notch for the pintle of the limiting means. A straight line which connects the axis of the pintle of the bearing with the axis of the pintle of the limiting means is preferably inclined relative to a straight line which connects the end portions of the link, at least when the holder is maintained in the starting position. Such lines preferably make an angle of less than 180 degrees. The inclination altering means includes the aforementioned pivot member which articulately connects the second end portion of the link to the bell crank lever of the means for moving the entraining means. The link can move the holder in the circumferential direction of the traction wheel. At such time, a preferably concave surface of the holder can slide along the aforementioned ring-shaped stop or stops on the traction wheel. Such concave surface can be said to constitute a follower which tracks the stop or stops on the traction wheel, and the holder can further comprise a fulcrum which is adjacent the follower and defines for the holder a pivot axis in response to altering of the inclination of the blade. The fulcrum can engage the stop or stops on the traction wheel.

The arms of the support for the holder are preferably movable transversely of the path and of the predetermined direction independently of each other, and each arm can be individually biased by a spring or the like. This enhances the versatility of the machine because the holder and the blade can more readily conform to the shape of a product and/or to the shape of the skin or rind which is to be severed from the remaining portion of the product during travel past the cutting edge of the blade. The thus mounted arms enable the holder to pivot about an axis which extends transversely of the path as well as to pivot about an axis which extends in the predetermined direction.

The support can include an abutment which opposes a movement of the holder in the predetermined direction in response to engagement of the cutting edge of the blade by a product in the predetermined path. Such abutment can be disposed in the region of the limiting means; for example, the abutment can have a face which is disposed in one of the recesses for the pintle of the limiting means. The face of the abutment can be a slightly or pronouncedly arcuate face with a center of curvature on or close to the pivot axis which is defined by the bearing for the holder. If the abutment is provided in the region of the limiting means, its face can extend transversely between the surfaces flanking the pintle of the limiting means in the respective recess or recesses of the support. Such face and a line connecting the axes of the pintles can make an acute angle, particularly an angle which equals or approximates 75 degrees.

The abutment is preferably designed to maintain at least one of the pintles out of the closed front end of the respective recess or aperture. Alternatively, the abutment can form part of or can be disposed in the region of the bearing. Such abutment can have a face which bounds the closed front end of the recess for the pintle of the bearing.

The machine can further comprise means for changing the orientation of the blade relative to the housing by way of the limiting means. If the support for the holder is movable up and down, it can form part of the orientation changing means because it can cause the holder, and hence the blade, to turn about the pivot axis of the bearing. The orientation changing means can further comprise means for selecting the maximum extent of downward movement of the support. This can be achieved by providing on the support a cam and by using a follower which is disposed between the cam and the pintle of the limiting means so as to change the distance between the cam and the pintle when caused to move relative to the support, e.g., in or counter to the predetermined direction. The follower can act not unlike a wedge which is movable by a pivotable lever or link so as to slide relative to the cam and the pintle of the limiting means.

A portion of the support for the holder, particularly the lower end portions of the arms which form part of the support, can be located beneath the traction wheel and forwardly of the limiting means or forwardly of the limiting means as well as forwardly of the bearing. This renders it possible to omit one of the aforementioned stops because the biasing means can be designed to permanently urge the arms against the ring-shaped stop or stops on the traction wheel.

The limiting means can include at least one eccentric which is movably mounted on at least one of the arms, and one or more followers provided on the holder and tracking the eccentric or eccentrics. The eccentric is preferably rotatable on the respective arm, and the follower or followers preferably extend counter to the direction of transport of products along the predetermined path.

The novel features which are considered as characteristic of the invention are set forth in particular in the appended claims. The improved machine itself, however, both as to its construction and its mode of operation, together with additional features and advantages thereof, will be best understood upon perusal of the following detailed description of certain specific embodiments with reference to the accompanying drawing.

DESCRIPTION OF PREFERRED EMBODIMENTS

Referring first to FIGS. 1 to 6, there is shown a machine M which can be used for the slicing or skinning (derinding) of slabs of bacon or like products. The machine M comprises a housing 1 which supports a set of conveyors defining an elongated path 26 (FIG. 2) along which the products move in the course of the slicing or skinning operation. The products are advanced in the direction of arrow A. The conveyors include a first endless belt or chain conveyor 3 which delivers successive products to the treating station, a rotary traction member 4 (hereinafter called wheel) which is disposed at the treating station and is located at the underside of the path 26 downstream of the conveyor 3, and a second endless belt or chain conveyor 9 which receives portions of treated products from the wheel 4 and delivers such material to a further processing station, not shown.

Figure 2:
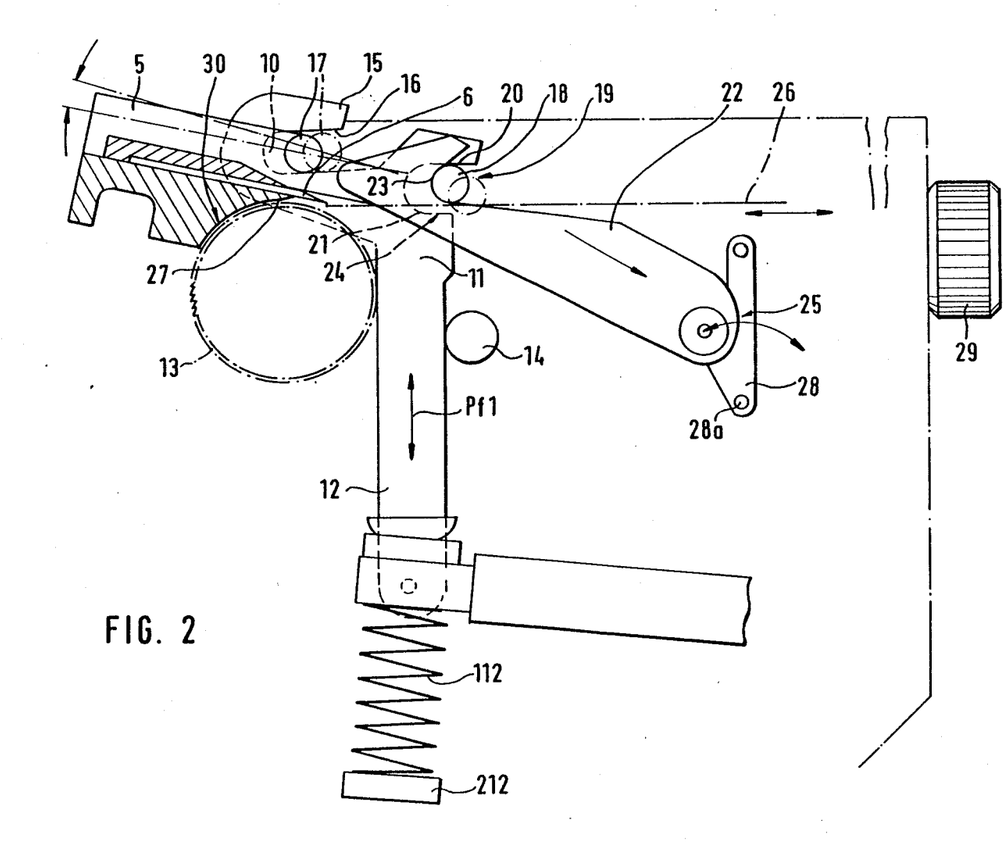
FIG. 2 is an enlarged fragmentary partly elevational and partly vertical sectional view of parts of the machine of FIG. 1 in the region of the treating station, the holder for the blade being shown in the starting position.

The wheel 4 is located beneath a mobile holder 5 for a blade or knife 6 which has a cutting edge S disposed at a level above the path 26 and facing counter to the direction of arrow A so as to penetrate into oncoming products and to sever therefrom slices at the periphery of the rotating wheel 4. The blade 6 is removably installed in the holder 5 or is removable from a support 11 jointly with the holder. The peripheral surface of the wheel 4 can be roughened (e.g., ribbed) so as to ensure predictable transport of successive products past the cutting edge S of the blade 6. The wheel 4 receives products from the discharge end of the conveyor 3.

Figure 1:
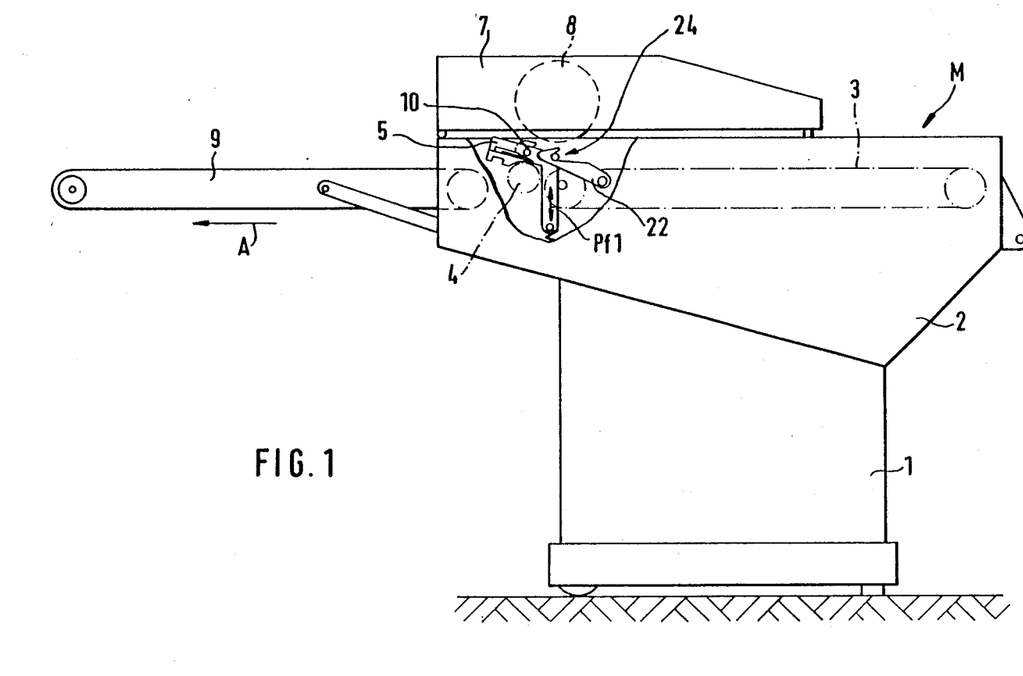
FIG. 1 is a schematic elevational view of a slicing or skinning machine which embodies one form of the invention, the housing being broken away in the region of the treating station.

The machine M further comprises a relatively large drum- or wheel-shaped hold-down device 8 which is installed on a mobile hood 7 at a level above the path 26. The arrangement is preferably such that the hood 7 is pivotably mounted on the housing 1 and that the hold-down device 8 is adjustably mounted in the hood 7. When the machine M is used to remove skins or rings from slabs of bacon, from pieces of meat or from fish, the skins or rinds are caused to descend in the housing 1 between the traction wheel 4 and the adjacent receiving end of the conveyor 9. A presently preferred use of the machine M is for separation of skins or rinds from slabs of bacon.

The machine M is provided with means for automatically maintaining the holder 5, and hence the blade 6, in a predetermined starting position (FIGS. 2, 3 and 5) in which the blade 6 is inclined relative to and makes with the path 26 a predetermined angle. At such time, the distance of the cutting edge S of the blade 6 from the peripheral surface of the wheel 4 is greater than when the holder 5 is moved to a second or working position (FIGS. 4 and 6) as a result of engagement of the cutting edge S by the oncoming product which is delivered by the conveyor 3 and is thereupon advanced by the wheel 4. To this end, the holder 5 constitutes or acts not unlike a tiltable balance beam which can pivot about the horizontal axis of a pintle 17 disposed at a level above the path 26 and extending into apertures 16 provided therefor in two discrete arms 12 (only one shown) of the support 11 which forms part of a means for yieldably urging the holder 5 and the blade 6 to the starting positions of FIGS. 2, 3 and 5. The apertures 16 and the pintle 17 constitute a bearing 10 for the holder 5, and the pivot axis which is defined by the pintle 17 extends transversely of the path 26 and transversely of the direction which is indicated by the arrow A. Each aperture 16 is a recess which has a closed front end (as seen in the direction of arrow A) and a preferably open rear end. The arms 12 of the support 11 for the holder 5 flank the path 26 and are movable up and down (note the double-headed arrow Pf1 in FIG. 2, i.e., transversely of the direction which is indicated by the arrow A and transversely of the path 26 so that they can move the bearing 10 toward and away from the path 26 and traction wheel 4. Stops are provided to hold the adjacent portions of the arms 12 against movement in and counter to the direction of arrow A. These stops include rings 13 on the traction wheel 4 and abutments (e.g., studs) 14 in the housing 1. Each arm 12 is disposed between a ring 13 on the traction wheel 4 and a stud 14. The studs 14 can be replaced with a single transversely extending stop which is installed in the housing 1 behind the arms 12 (as seen in the direction of arrow A).

Figure 3:
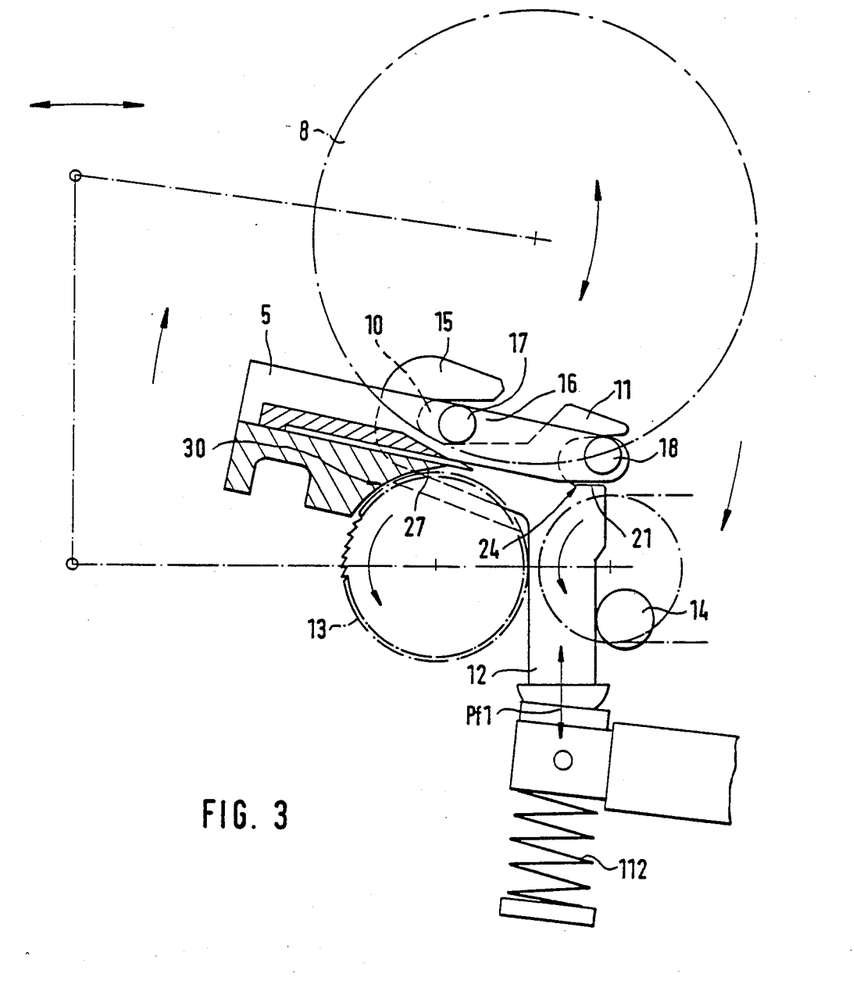
FIG. 3 is a similar enlarged fragmentary partly elevational and partly sectional view, showing the support for the holder by solid lines and further showing a hold-down device which is indicated by phantom lines.
Figure 4:
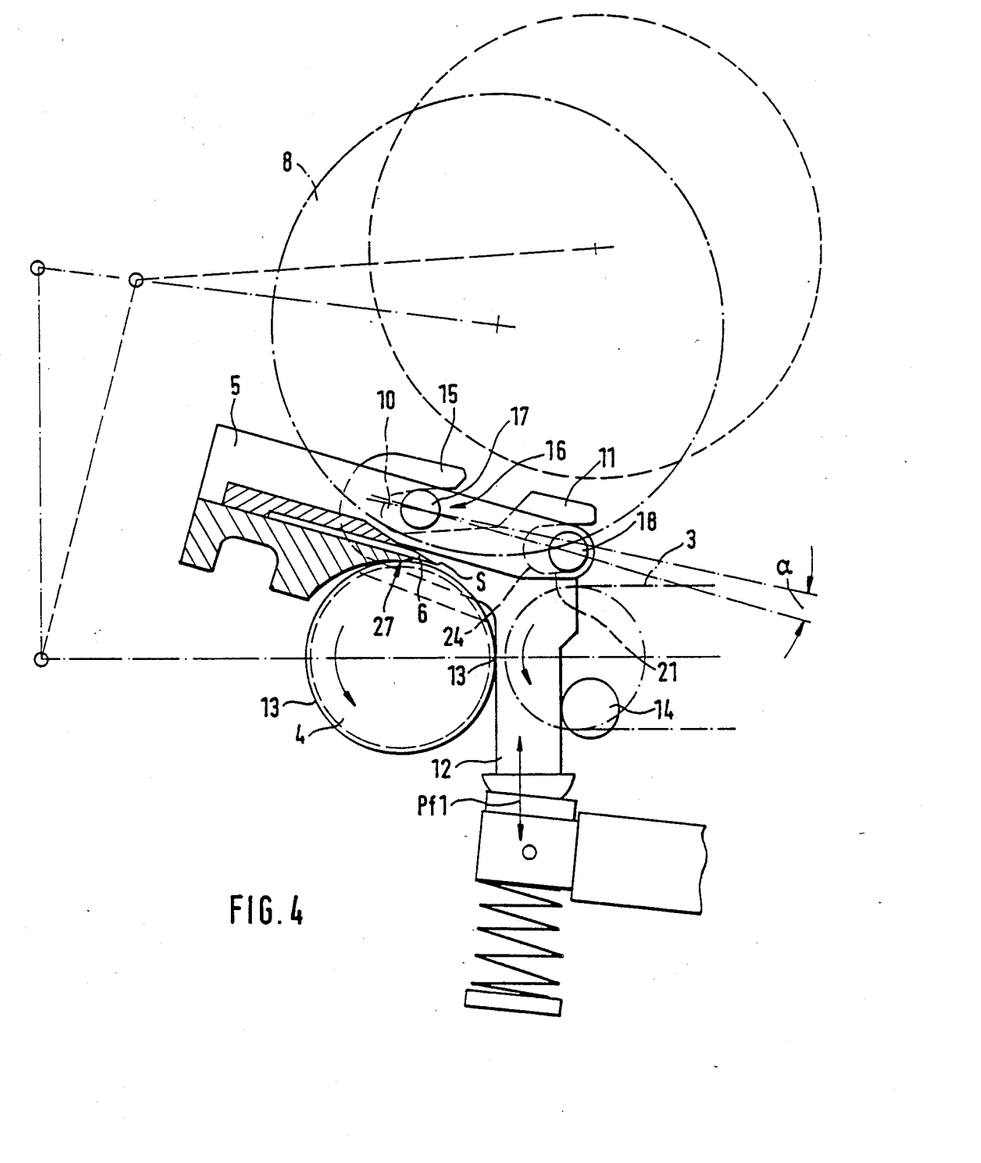
FIG. 4 illustrates the structure of FIG. 3 but with the holder in the working position.

The arms 12 are movable up and down independently of each other and are acted upon by biasing means in the form of coil springs 112. Moreover, the arms 12 are independently adjustable up and down, together with the respective springs 112. The adjusting means can include retainers 212 for the springs 112 of which only one can be seen in FIG. 2. The springs 112 can be replaced with other types of biasing means which are capable of urging the holder 5 and the blade 6 to the starting positions of FIGS. 2, 3 and 5. Such springs or other suitable biasing means ensure that the blade 6 can change its position relative to the path 26 in dependency on variations of thickness of a product in as well as transversely of the direction which is indicated by the arrow A. Independent movability of the arms 12 which form part of the support 11 for the holder 5 enables the latter to change its inclination (i.e., to change the inclination of the axis which is defined by its pintle 17) with reference to a horizontal plane. The arms 12 can also move jointly in order to change the position of the holder 5 and blade 6, in dependency on changes in the thickness of successive increments of a slab, in the direction of arrow A. Thus, independent movability of the arms 12, coupled with the bias of the springs 112, enables the blade 6 to follow the outline of the adjacent upper side of a product which advances along the path 26 and is to be skinned or sliced by the cutting edge S. Such practically universal movability of the blade 6 in dependency on variations of thickness or shape of the product in and transversely of the direction which is indicated by the arrow A is achieved in a very simple and inexpensive way by the novel expedient of individually biasing the arms 12 and by enabling the arms 12 to move up and down independently of one another. As can be seen in FIGS. 2 to 4, the arms 12 are disposed behind of the wheel 4 (again as seen in the direction of arrow A), and each of these arms has an upper end portion or head 15 which is formed with one of the aforementioned apertures 16 for the pintle 17 of the bearing 10 and with apertures 19 for the pintle 19 of a device 24 which serves to limit the extent of movability of the holder 5 and blade 6 from the starting positions of FIGS. 2, 3 and 5 when the blade 6 is acted upon by a product which is advanced by the wheel 4. The front ends of the apertures or recesses 16, 19 are closed, and the rear ends of these apertures or recesses are preferably open. The heads 15 of the arms 12 include substantially hook-shaped portions which define the apertures 16 and 19. The aperture 19 is located behind the aperture 16. The open ends of the apertures 16 and 19 enable an operator to insert or remove the pintles 17 and 18; each of these pintles includes two coaxial portions, one on each marginal portion of the holder 5.

The width (height) of the apertures 16 only slightly exceeds the diameter of the pintle 17 so that the bearing 10 including the apertures 16 and the pintle 17 permits angular movements of the holder 5 relative to the heads 15 of the arms 12. On the other hand, the height of the rear apertures 19 exceeds the diameter of the pintle 18 so as to enable the rear portion of the holder 5 to move (within limits) up and dow relative to the heads 15. The pintle 18 is movable in the apertures 19 between top surfaces 20 which bound the apertures 19 from above and bottom surfaces 21 which are disposed beneath the pintle 18 opposite the top surfaces 20. The pintle 18 abuts the top surfaces 20 in the starting position of the holder 5, and the pintle 18 abuts the bottom surfaces 21 when the holder 5 assumes a position in which the cutting edge S of the blade 6 is nearest to the periphery of the wheel 4 (it being assumed here that the levels of the arms 12 remain unchanged).

Figure 5:
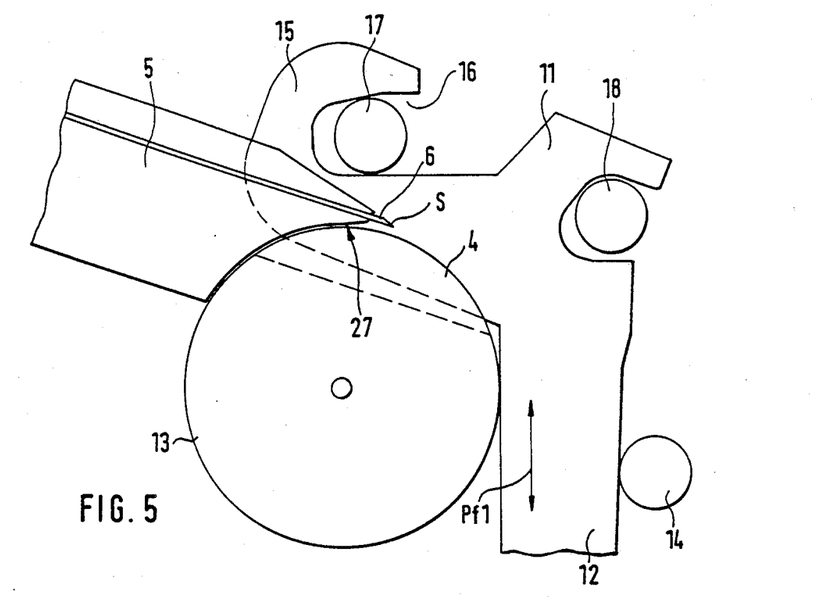
FIG. 5 is an enlarged view of certain details of the structure which is shown in FIG. 3, with the older shown in the starting position.

The springs 112 automatically move the holder 5 to the starting position of FIGS. 2, 3 and 5 when the cutting edge S of the blade 6 is not engaged by an advancing product. The pintle 18 then abuts the surfaces 20 in the apertures 19. At the same time, the holder 5 abuts the ring-shaped stops 13 on the traction wheel 4.

The embodiment of the machine M which is shown in FIGS. 1 to 6 further comprises means for altering the inclination of the blade 6 relative to the path 26 independently of the products which advance toward and into engagement with the cutting edge S. Such inclination altering means comprises two entraining elements in the form of links 22 (only one shown) which flank the path 26 and each of which cooperates with the respective portion of the pintle 18. The front end portions of the links 22 have upper edge faces provided with notches or sockets 23 for reception of parts of or the entire portions of the pintle 18. The rear end portions of the links 22 are articulately connected to the shorter arms of discrete bell crank levers 28 by pivot members 25, and each of these bell crank levers is pivotable in the housing 1, as at 28a. The longer arms of the levers 28 are operatively connected with rotary adjusting knobs 29 which can be rotated relative to the housing 1 in order to pivot the respective levers 28 clockwise or counterclockwise and to thereby move the notches 23 toward or away from the wheel 4, i.e., in or counter to the direction which is indicated by the arrow A. A straight line which connects the axis of the pivot member 25 of FIG. 2 with the axis of the pintle 18 of the inclination limiting device 24 is inclined relative to a straight line which connects the axis of the pintle 18 with the axis of the pintle 17, at least when the holder 5 assumes the starting position of FIGS. 2, 3 and 5. The arrangement is such that the two straight lines then make an obtuse angle and a straight line connecting the axis of the pintle 18 with the axis of the pivot member 25 slopes downwardly and rearwardly with reference to the line which connects the axes of the pintles 17 and 18. Otherwise stated, the pintle 18 is then located above the straight line connecting the axis of the pintle 17 with the axis of the pivot member 25. The notch 23 of each link 22 snugly receives the respective portion of the pintle 18 when the holder 5 is maintained in the starting position of FIGS. 2, 3 and 5 and, at such time, the pintles 17 and 18 are spaced apart from the closed front ends of the respective apertures 16, 19 in the heads 15 of the arms 12. Thus, the holder 5 is held against movement in the direction of arrow A because its pintle 18 is engaged by the surfaces bounding the notches or sockets 23 in the front end portions of the links 22. It can be said that the pivot members 25 constitute fixed points of a kinematic system which includes the holder 5 and the links 22. The pivot members 25 permit movements of the holder 5, arms 12 and links 22 with reference to the respective bell crank levers 28. The links 22 are omitted in FIGS. 3 to 6 for the sake of clarity.

The operation of the machine M of FIGS. 1 to 6 is as follows:

When the wheel 4 is not in the process of advancing a product toward and onto the conveyor 9, the blade 6 and the holder 5 are held in the starting positions of FIGS. 2, 3 and 5 in which the holder 5 abuts the ring-shaped stops 13 on the traction wheel 4. The weight of the holder 5 tends to maintain it in the starting position. The thus generated force is transmitted to the pivot members 25 by way of the links 22. The arms 12 are biased by the springs 112 and are held in their lowermost positions.

Figure 6:
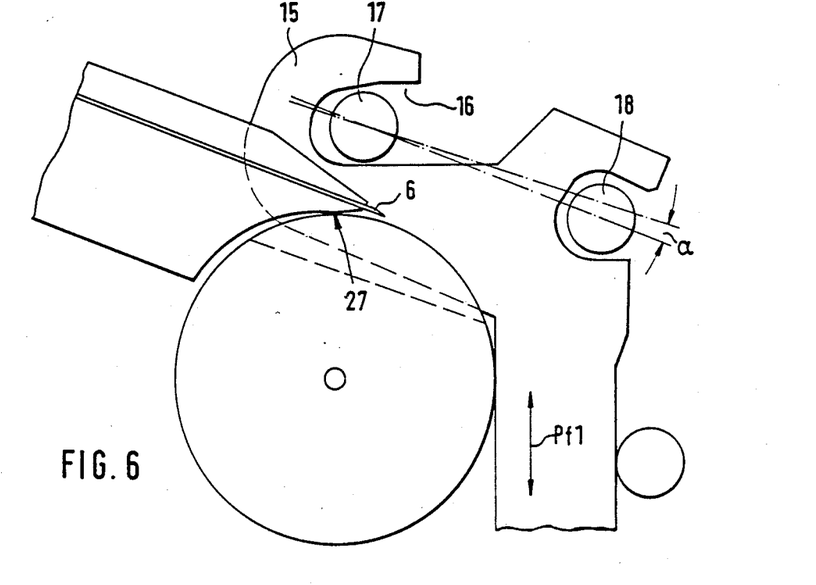
FIG. 6 is a similar enlarged view of certain details of the structure which is shown in FIG. 4, with the holder shown in its working position.

If a product (such a a slab of bacon which must be skinned) is advanced by the conveyor 3 along the path 26 and into the range of the rotating traction wheel 4, such product automatically moves the holder 5 from the starting position of FIGS. 2, 3 and 5 as a result of engagement with the cutting edge S of the blade 6 so that the holder 5 and the blade 6 assume the working or second positions which are shown in FIGS. 4 and 6. The product causes a stretching of the linkage which includes the links 22 and the portion of the holder 5 between the pintles 17 and 18. At the same time, the holder 5 also turns about the axis of the pintle 17. The changeover from the starting position of FIGS. 2, 3 and 5 to the working position of FIGS. 4 and 6 takes place very rapidly so that the initial part of the cut which is being made during movement of the holder 5 and blade 6 from the positions of FIGS. 2, 3 and 5 to the positions of FIGS. 4 and 6 is very short. Experiments indicate that the reaction of the holder 5 and blade 6 to engagement of the cutting edge S by the oncoming product is so rapid that a naked eye is incapable of detecting any departure from optimum skinning operation during the initial stage of cutting into the product, i.e., while the position of the blade 6 changes from that shown in FIGS. 2, 3 and 5 to the position of FIGS. 4 and 6.

As the product continues to advance along the path 26, the skin advances beneath the blade 6 into and descends in the space between the holder 5 and the traction wheel 4 whereas the major part of the product advances toward and onto the conveyor 9. The support 11 for the holder 5 is biased downwardly by the springs 112 and can yield during skinning so that the holder 5 can move upwardly. As can be seen in FIGS. 4 and 6, the holder 5 is pivotable relative to the wheel 4 about a horizontal axis which is parallel to the axis of the traction wheel 4 and is defined by a fulcrum 27 behind a concave surface or follower 30 of the holder. Tilting of the holder 5 takes place simultaneously with an upward or downward movement of the arms 12, such upward or downward movement taking place to ensure that the cutting edge S can follow variations of thickness of the skin or rind which is being severed from the main portion of the product. This guarantees that little or no fat is left on the separated skin. When the holder 5 is held in the working position of FIGS. 4 and 6, its inclination relative to the links 22 varies automatically in dependency upon the magnitude of forces acting upon the cutting edge S of the blade 6. At such time, the pintle 18 may but need not abut the surfaces 21 in the bottom portions of the recesses or apertures 19 in the heads 15 of the arms 12.

When necessary, the operator can turn the adjusting knobs 29 so as to change the inclination of the respective bell crank levers 28 and to thus move the links 22 in or counter to the direction which is indicated by the arrow A. These adjustments of the inclination of levers 28 entail a movement of the holder 5 in the circumferential direction of the wheel 4. At such time, the surface 30 of the holder 5 slides along the ring-shaped stops 13 of the traction wheel 4. If necessary, the adjusting means 212 for the arms 12 can be actuated simultaneously with adjustment of angular positions of the bell crank levers 28 so as to modify the movements of the holder 5 under the action of the links 22, i.e., in response to rotation of the adjusting knobs 29. Adjustments of the position of the holder 5 by way of the knobs 29, levers 28 and links 22 are carried out for the purpose of effecting precise changes of inclination of the blade 6. Such adjustments might be necessary or advisable in order to account for different characteristics of successively treated products, for example, of products with relatively hard (burned) skins or rinds, products with boiled skins or rinds and/or others.

The concave surface or follower 30 can extend transversely of the entire holder 5. As mentioned above, such surface can engage the ring-shaped stops 13 of the traction wheel 4 and is located in front of the aforementioned fulcrum 27 (as seen in the direction of arrow A). The pivot axis which is defined by the fulcrum 27 is or can be located in the common plane of the axis of the traction wheel 4 and the axis of the pintle 17. The bearing 10 (including the pintle 17) is preferably adjacent or closely adjacent the blade 6. This ensures that, when an oncoming product causes the holder 5 to leave the starting position of FIG. 2 and to assume the working position of FIG. 4, the reaction time is very short and the cutting edge S of the blade 6 must only cover a very short distance in the direction of advancement of products along their path.

The inclination altering means including the links 22, pivot members 25, bell crank levers 28 and adjusting knobs 29 constitutes a desirable but optional feature of the machine M. If the inclination altering means is omitted, the holder 5 abuts suitable stops within the arms 12 of the support 11. For example, the pintle 17 then abuts the surfaces in the closed front ends of the apertures 16 in the heads 15 of the arms 12. Such simplification of the machine M still enables the holder 5 to be tilted from the starting position of FIGS. 2, 3 and 5 to the working position which is shown in FIGS. 4 and 6. When the holder 5 reaches the working position, the pintle 18 abuts the surfaces 21 in the apertures 19. The extent of angular movement of the holder 5 between the starting position of FIGS. 2, 3 and 5 and the working position of FIGS. 4 and 6 is indicated by the angle alpha (see FIGS. 4 and 6).

The machine M can be set up for the slicing of slabs of bacon or like products. This necessitates an appropriate upward movement of the arms 12. Such upward movement of the arms 12 entails a rearward movement of the holder 5 (i.e., counter to the direction of arrow A) because the upwardly moving arms 12 cause the holder 5 to pivot the links 22 clockwise (as seen in FIG. 2) with the resultant movement of the holder 5 in a direction to the right. Such rearward movement of the holder 5 ensures that the blade 6 and its cutting edge S assume optimum positions for the slicing of slabs of bacon or the like. Thus, the width of the gap between the traction wheel 4 and the blade 6 then decreases in the direction of arrow A. Consequently, the slices which are separated from the bulk of the product by the blade 6 and enter the space between the traction wheel 4 and the adjacent rear end of the conveyor 9 undergo a certain amount of compression which is desirable in many or most instances.

It is preferred to select the inclination of the blade 6 in such a way that it slopes rearwardly and downwardly and makes with the path 26 and acute angle of 5 to 20 degrees, preferably approximately 12 degrees.

Figure 7:
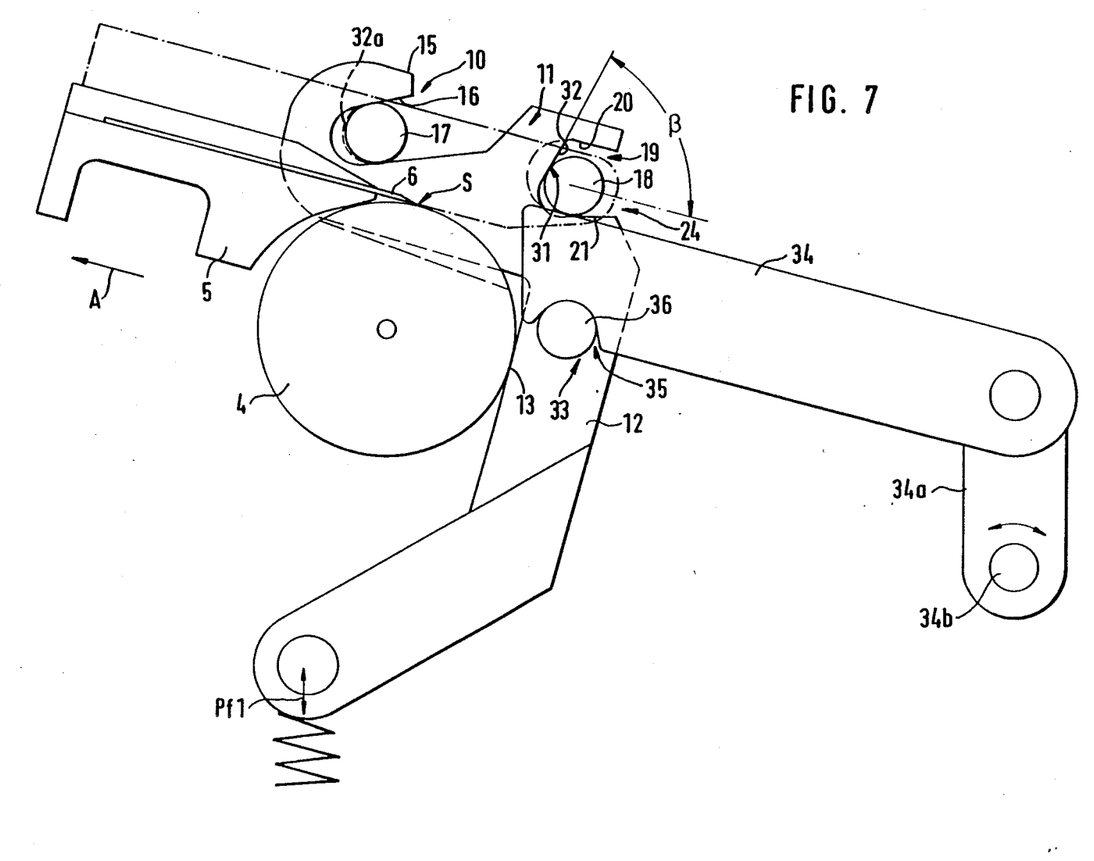
FIG. 7 is a fragmentary elevational view of a portion of a second machine, with the holder shown in the working position.
Figure 8:
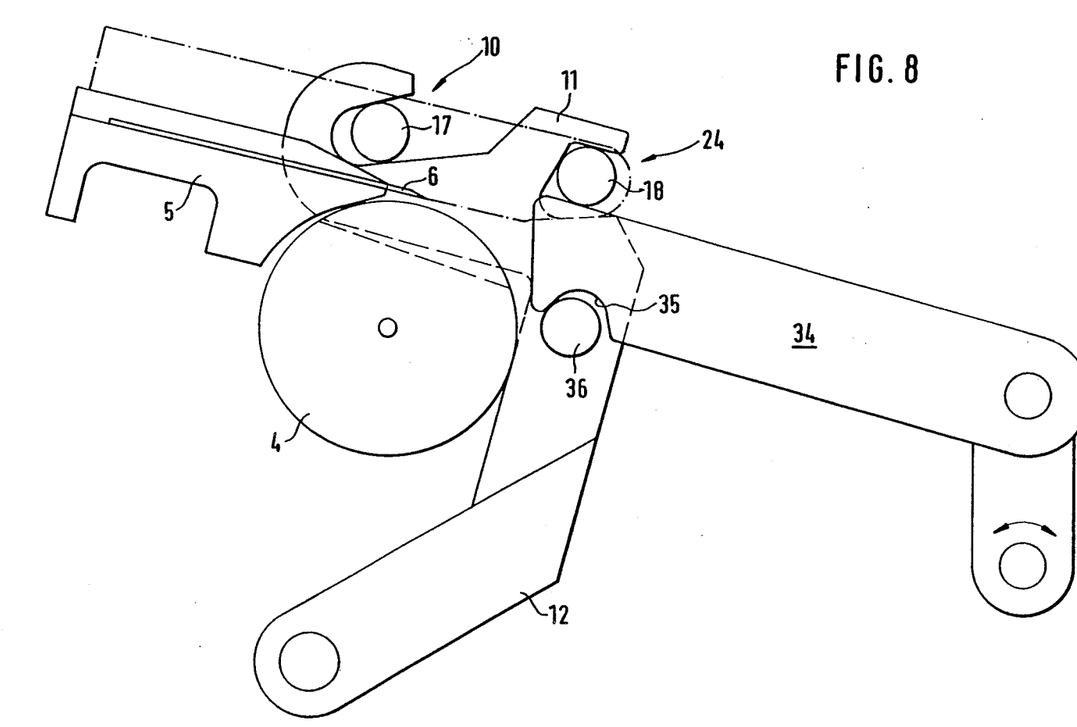
FIG. 8 shows the structure of FIG. 7 but with the holder in starting position.

FIGS. 7 and 8 show a portion of a modified slicing or skinning machine. The inclination limiting means 24 cooperates with an abutment 31 including two substantially flat faces 32 in the apertures 19 of the heads 15. The faces 32 can be engaged by the respective portions of the pintle 18. The pintle 18 contacts the faces 32 of the abutment 31 in order to prevent forward movement of the holder 5 under the action of a product which is advanced by the traction wheel 4. The faces 32 are provided in the region of the closed front ends of the apertures 19. The embodiment of FIGS. 7 and 8 is characterized by simplicity, ruggedness and stability. This is desirable and advantageous when the product is an aged and relatively hard slab of bacon which is likely to exert upon the blade 6 a pronounced force tending to move the holder 5 in the direction of arrow A. Moreover, the faces 32 of the abutment 31 ensure that the blade 5 can remain in the position which is selected therefor for a particular slicing or skinning operation, i.e., that the blade 6 remains in an optimum position, as seen in the direction of arrow A, as well as that the inclination of the blade relative to the path of movement of oncoming products is best suited for the treatment of products. The configuration of the faces 32 in the apertures 19 can be selected in such a way that each of these faces has its center of curvature on the axis of the pintle 17, i.e., that the curvature of the faces 32 matches the curvature of the path of movement of the axis of the pintle 18 about the axis of the pintle 17 when the holder 5 is caused to pivot about the axis of the pintle 17. Each of the faces 32 can extend all the way between the surfaces 20 and 21 in the respective aperture 19. The inclination (note the angle beta) of the faces 32 relative to a straight line connecting the axes of the pintles 17, 18 is less than 90 degrees and is preferably close to or matches 75 degrees. Such inclination of the faces 32 with reference to the just mentioned straight line reduces the resistance which the holder 5 encounters during movement from the starting position of FIG. 8 to the working position of FIG. 7, i.e., during that movement which takes place when the blade 6 is engaged by the oncoming product. This reduces the reaction time of the holder 5 and improves the quality of the cuts, even of the initial stage of each cut.

If a tilting of the holder 5 about the axis of the pintle 17 does entail a certain longitudinal shifting of the holder because the faces 32 slide along the pintle 18, the front aperture 16 in each of the arms 12 must be dimensioned in such a way that there is room for such longitudinal shifting of the holder 5 relative to the arms 12. This is shown in FIGS. 7 and 8 wherein the surfaces bounding the closed front ends of the apertures 16 are spaced apart from the respective portions of the pintle 17. Thus, when the pintle 18 contacts the faces 32 of the abutment 31, the pintle 17 is not located in the deepmost portions of the apertures 16.

The arms 12 of the support 11 for the holder 5 which is shown in FIGS. 7 and 8 have lower end portions which are located at a level beneath the wheel 4. Such lower end portions of the arms 12 are located to the left of the inclination limiting device 24 and also to the left of the bearing 10 including the pintle 17 and the aperture 16. Such configuration and orientation of the arms 12 ensures that the arm are less likely to be moved away from the traction wheel 4 under certain operating conditions. Moreover, such configuration and orientation of arms 12 ensures that the stops 14 (which are used in the embodiment of FIGS. 1 to 6) can be dispensed with.

The machine which embodies the structure of FIGS. 7 and 8 also comprises means for altering the inclination of the blade 6, namely for effecting highly accurate adjustments of inclination of the blade 6 relative to the path of advancement of products toward and past the traction wheel 4. Such inclination altering means is designed to alter the inclination of the blade 6 at least in the working position of the holder 5 (FIG. 7), and includes at least one wedge-like follower 34 which has a left-hand portion resembling a pallet and defining a recess or notch 35 for a cam 36 on the adjacent arm 12. The top edge face of the follower 34 serves as a rest for the pintle 18 of the inclination limiting device 24. If the follower 34 is moved longitudinally in response to pivoting of an actuating member 34a about the axis of a pivot pin 34b, the notch 35 moves relative to the cam 36 in a direction to the left or to the right (compare FIGS. 7 and 8) to thereby automatically change the level of the pintle 18 and hence the inclination of the holder 5 and blade 6. This renders it possible to change the orientation of the blade 6 at least in the working position of the holder 5.

The apertures 16 can also be bounded by abutments including faces corresponding to those shown at 32 in the apertures 19 of the machine which includes the structure of FIGS. 7 and 8. A concave face 32a is shown in FIG. 7 by broken lines.

Figure 9:
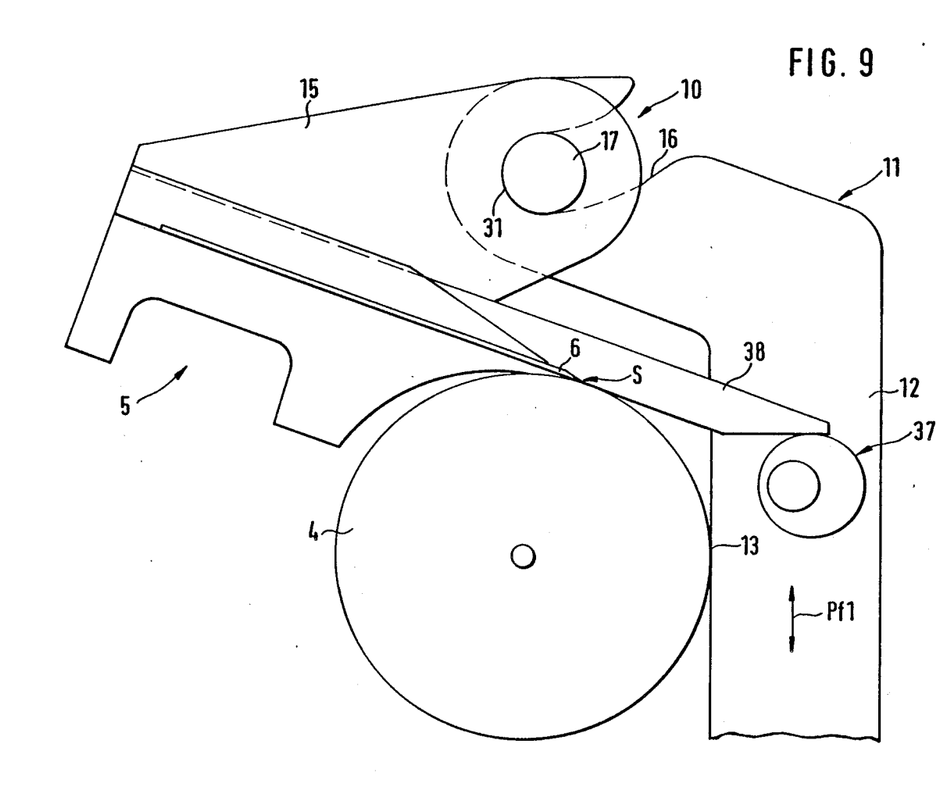
FIG. 9 is a fragmentary elevational view of a portion of a third machine, the holder being shown in the working position.
Figure 10:
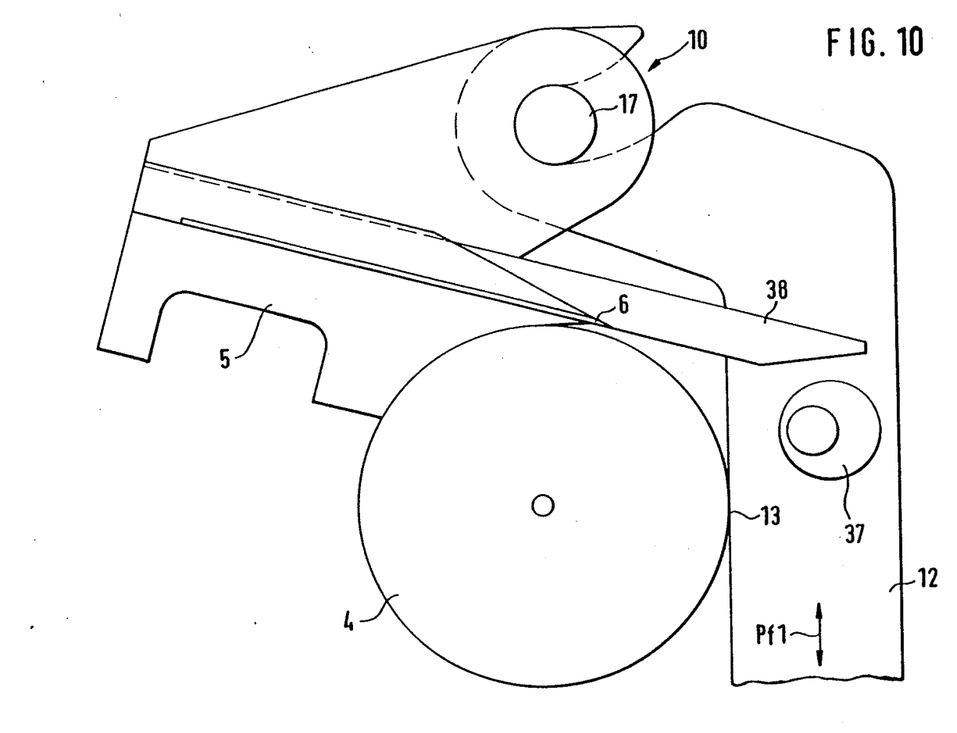
FIG. 10 shows the structure of FIG. 9 but with the holder in starting position.

Referring to FIGS. 9 and 10, there is shown a portion of a third slicing or skinning machine wherein the head 15 of each of the arms 12 (only one arm 12 can be seen) is provided with a single aperture or recess 16 for the corresponding portion of the pintle 17. The bearing 10 including the pintle 17 and the apertures 16 serves as a means for defining a pivot axis for the holder 5 as well as to transmit (at 31) to the arms 12 forces which are applied to the holder when the cutting edge S of the blade 6 is engaged by an oncoming product. Such forces cause the arms 12 to bear against the ring-shaped stops 13 on the traction wheel 4. The abutment 31 of this machine has concave faces bounding the closed front ends of the apertures 16.

A combined means for altering the inclination of the blade 6, at least in the working position of the holder 5, and for limiting the extent of movability of the holder 5, comprises an eccentric 37 which is rotatably mounted on the illustrated arm 12 and whose peripheral surface is engaged by a rearwardly extending follower 38 of the holder 5. Each of the arms 12 can carry a discrete eccentric 37, and the holder 5 is then provided with two followers 38, one for each of the two eccentrics. The means for changing the angular position of the eccentric 37 is not shown in FIGS. 9 and 10. If the eccentric 37 is turned (e.g., by a motor or by a suitable tool), the distance of the cutting edge S of the blade 6 from the adjacent portion of the traction wheel 4 is changed in the working position of the holder 5. Such working position of the holder 5 is shown in FIG. 9. As explained above, the holder 5 assumes its working position when the blade 6 is engaged by an oncoming product. Of course, the level of the cutting edge S can also be changed by the product itself in that the arms 12 can be moved by the product upwardly against the opposition of the springs 112 (not shown in FIGS. 9 and 10) or under the bias of such springs. The directions in which the arms 12 are movable up and down (against the opposition of or under the bias of the springs 112) are indicated by a double-headed arrow Pf1.

An advantage of the embodiment which is shown in FIGS. 9 and 10 is that it can stand pronounced stresses which develop when the blade 6 is in the process of cutting a rather tough product.

All illustrated embodiments of the improved machine share the advantage that the interval of time which elapses during movement of the holder 5 between its starting and working position is very short so that the difference between the quality of the cut which is made in working position of the holder and the quality of the cut which is made while the holder is moved from its starting position is negligible or is not noticeable at all. In addition, the machine is simple, compact and capable of standing long periods of use irrespective of the toughness of products which must be skinned or sliced during travel past the cutting edge S of the blade 6.

All illustrated embodiments of the machine also share the advantage that the position of the blade 6 in the working position of the holder 5 can be adjusted in a simple, efficient and time-saving manner, either by the mechanism including the parts 22, 25, 28 and 29, by the mechanism including the lever or levers 34 or by the mechanism including the eccentric or eccentrics 37. Of course, such mechanisms can be used with equal advantage to adjust the orientation of the blade 6 in the starting position of the holder 5. These adjustments are desirable and advantageous in order to take into account certain differences between successively treated products, e.g., the toughness of the mass to be severed, the thickness of the skin and/or others.

Another important advantage of the improved machine is that the quality of products which are being treated does not influence, or does not unduly influence, the length of the interval which elapses during movement of the blade 6 and holder 5 from the starting positions to the working positions. One of the reasons for such independence of operation of the machine from the quality of processed products is that the urging means (including the support 11 and the springs 112) continuously tends to maintain the holder 5 in its starting position. The feature that the operation of the machine is not unduly affected by the quality of processed products contributes to higher reliability of the machine.

Since the holder 5 can move about the axis of the pintle 17 (i.e., about the axis which is defined by the bearing 10) and is also movable up and down in its entirety in response to upward or downward movement of the support 11, the cutting edge S is ideally suited to follow the outline of the upper side of a rind during skinning of a slab of bacon or the like. This will be readily appreciated since the blade 6 is movable about a plurality of different axes including the axis of the pintle 17, the axis of the pintle 19 or eccentric 37, and an axis which extends in the direction of the arrow A (because the arms 12 of the support 11 are movable up and down relative to each other). Such universal-movability of the holder 5 about a number of mutually inclined and/or parallel axes ensures that the holder can rapidly assume an optimum position in which the cutting edge S of the blade 6 is capable of making a most satisfactory cut, particularly by following the outline of the upper side of a rind which is being separated from the bulk of a slab of bacon.

An advantage of the apertures (19 and/or 16) in the form of recesses which are open at their rear ends is that the holder 5 can be rapidly detached from the support 11, particularly for the purposes of inspection, cleaning and/or replacement of a blade 6. The recesses are dimensioned to provide ample room for all required movements of the support 11 and holder 5 relative to each other.

The concave surface or follower 30 of the holder 5 exhibits the advantage that it enables the holder to change its position relative to the conveyed products by moving about the axis of the traction wheel 4, i.e., in the circumferential direction of the traction wheel. The weight of the holder 5 tends to maintain it in the starting position in which the surface 30 bears upon the ring-shaped stops 13 of the traction wheel 4. During movement of the holder 5 from the starting to the working position, the surface 30 is lifted off the stops 13 and the holder 5 then pivots about the fulcrum 27 which contacts the stops 13 so as to ensure a highly predictable movement of the holder 5 from the starting to the working position. Such contact between the fulcrum 27 and the stops 13 is particularly important if the product to be treated is relatively soft and such product (e.g., the rind) penetrates beneath the fulcrum 27 and the following part of the holder 5.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A machine for slicing and/or skinning slabs of bacon and like products, comprising a housing; means for advancing products in said housing in a predetermined direction along a predetermined path, including a traction member at one side of said path; a blade holder at the other side of said path; a blade in said holder, said blade having a cutting edge; a bearing pivotably mounting said holder for movement of said cutting edge nearer to and further away from said traction member; means for yieldably urging said holder to a starting position in which said cutting edge is located at a predetermined distance from said traction member, said holder being movable away from said starting position as a result of engagement of the cutting edge by the products in said path; and means for limiting the extent of movability of said holder from said starting position.

2. The machine of claim 1, wherein said blade is inclined with reference to said path in the starting position of said holder, said limiting means being spaced apart from said bearing.

3. The machine of claim 2, wherein said holder is located at a level above said path and said blade is inclined downwardly counter to said direction.

4. The machine of claim 1, wherein said urging means includes a support for said bearing and means for biasing said support in a second direction transversely of said predetermined direction so as to urge said cutting edge nearer to said traction member, and further comprising stop means for confining said support to movements in said second direction.

5. The machine of claim 4, further comprising means for adjusting the bias of said biasing means upon said support.

6. The machine of claim 1, wherein aid urging means includes a support for said holder and said bearing comprises at least one aperture provided in said support, extending in said direction and having a closed front end, as seen in said direction, and at least one pintle provided on said holder and extending into said aperture transversely of said direction.

7. The machine of claim 6, wherein said aperture is a recess which has an open rear end.

8. The machine of claim 1, wherein said urging means includes a support for said holder and said limiting means comprises at least one aperture provided in said support, extending in said direction and having a closed front end, as seen in said direction, and at least one pintle provided on said holder and extending into said aperture transversely of said direction.

9. The machine of claim 8, wherein said aperture is a recess having an open rear end.

10. The machine of claim 1, wherein said bearing is disposed ahead of the limiting means, as seen in said direction.

11. The machine of claim 1, wherein said urging means includes a support for said holder and means for biasing said support transversely of said path so as to urge said blade toward said traction member, said support having arms flanking said path and further comprising stops arranged to confine the arms to movements substantially transversely of said direction.

12. The machine of claim 11, wherein said stops include at least one first stop provided on said traction member and at least one second stop provided in said housing opposite the first stop.

13. The machine of claim 11, wherein said traction member includes a wheel and said arms are disposed behind said wheel, as seen in said direction.

14. The machine of claim 1, wherein said urging means includes a support for said holder and means for biasing said support transversely of said path so as to urge said blade nearer to said traction member, said support having two arms flanking said path and including portions of said bearing and said limiting means.

15. The machine of claim 14, wherein said arms have heads at said other side of said path, said portions of said bearing and said limiting means comprising first and second apertures provided in said heads, said bearing further comprising a first pintle provided on said holder and extending into said first apertures transversely of said direction, said limiting means further comprising a second pintle provided on said holder and extending into said second apertures transversely of said direction.

16. The machine of claim 1, wherein said blade slopes toward said path counter to said direction at an angle of 5 to 20 degrees.

17. The machine of claim 16, wherein said angle is approximately 12 degrees.

18. The machine of claim 1, wherein said blade is inclined with reference to said path and further comprising means for altering the inclination of said blade.

19. The machine of claim 18, wherein said traction member includes a rotary wheel, said urging means including a support for said holder and said inclination altering means including means for moving said support relative to said housing so as to move the holder in the circumferential direction of said wheel.

20. The machine of claim 19, wherein said means for moving said support includes mobile entraining means coupled to said support and means for moving said entraining means between a plurality of different positions.

21. The machine of claim 20, wherein said entraining means comprises at least one link arranged to move said support by way of said limiting means.

22. The machine of claim 21, wherein said limiting means comprises a pintle provided on said holder and an aperture for said pintle in said support, said link having a first end portion engaging said pintle and a second end portion, said means for moving said entraining means being operatively connected to the second end portion of said link.

23. The machine of claim 22, wherein the first end portion of said link has a socket for said pintle.

24. The machine of claim 22, wherein said bearing includes a second pintle provided on said holder and extending into a second aperture of said support, a first line connecting said pintles being inclined relative to a second line connecting the end portions of said link when said holder is maintained in said starting position.

25. The machine of claim 24, wherein said lines make an angle of less than 180 degrees.

26. The machine of claim 25, wherein said inclination altering means comprises means for pivotally connecting the second end portion of said link to the moving means for said entraining means.

27. The machine of claim 19, wherein said wheel has at least one stop abutting said holder in the starting position of said holder, said inclination altering means including means for moving the holder relative to said stop in the circumferential direction of said wheel.

28. The machine of claim 27, wherein said stop includes a ring.

29. The machine of claim 28, wherein said holder includes a follower tracking said stop and a fulcrum adjacent said follower and defining for the holder a pivot axis in response to altering of the inclination of said blade.

30. The machine of claim 29, wherein said bearing defines for said holder a second pivot axis, said pivot axes and the axis of rotation of said wheel being disposed in or close to a common plane and said fulcrum being disposed between said bearing and said wheel.

31. The machine of claim 1, wherein said urging means includes a support for said holder, said support having arms flanking said path and being movable transversely of said path independently of each other, said urging means further comprising means for biasing said arms in a direction to move said blade toward said traction member.

32. The machine of claim 1, wherein said urging means comprises a support for said bearing, said support including an abutment which opposes a movement of said holder in said direction in response to engagement of said cutting edge by a product on said path.

33. The machine of claim 32, wherein said abutment is disposed in the region of said limiting means.

34. The machine of claim 33, wherein said limiting means includes an aperture in said support and a pintle provided on said holder and extending into said aperture, said abutment having a face which is disposed in said aperture and is rigid with said support.

35. The machine of claim 32, wherein said bearing defines for the holder a pivot axis which extends transversely of said path and of said direction, said abutment having an arcuate face with a center of curvature on or close to said pivot axis.

36. The machine of claim 32, wherein said limiting means includes a recess in said support and a pintle provided on said holder and extending into said recess, said support further having two surfaces disposed in said recess and flanking said pintle and said abutment having at least one face disposed in the region of said recess and extending between said surfaces.

37. The machine of claim 36, wherein said bearing defines for said holder a pivot axis which is spaced apart from and parallel to the axis of said pintle, a straight line which connects said axes and said face making an acute angle.

38. The machine of claim 37, wherein said angle equals or approximates 75 degrees.

39. The machine of claim 32, wherein said bearing comprises a recess which is provided in said support and has a closed front end as seen in said direction, and a pintle provided on said holder and extending into said recess transversely of said path, said limiting means including a second recess provided in said support and a second pintle provided on said holder and extending into said second recess transversely of said path, said second recess having a closed front end as seen in said direction and said abutment having means for maintaining at least one of said pintles out of the closed front end of the respective recess.

40. The machine of claim 32, wherein said abutment forms part of said bearing.

41. The machine of claim 40, wherein said bearing includes a recess provided in said support and having a closed front end as seen in said direction, and a pintle provided on said holder and extending into said recess transversely of said path, said abutment including a face bounding the closed front end of said recess.

42. The machine of claim 1, further comprising means for changing the orientation of said blade relative to said housing by way of said limiting means.

43. The machine of claim 42, wherein said urging means includes a support for said holder, said bearing being provided on said support and said support being movable up and down to thereby change the orientation of said blade relative to said housing, said orientation changing means including means for selecting the maximum extent of downward movement of said support.

44. The machine of claim 43, wherein said limiting means comprises a recess in said support and a pintle provided on said holder and extending into said recess transversely of said path, said orientation changing means comprising a cam provided on said support, a follower disposed between said cam and said pintle, and means for moving said follower so as to move said cam and said pintle apart.

45. The machine of claim 1, wherein said urging means comprises a support having a portion disposed beneath said traction member ahead of said limiting means, as seen in said direction.

46. The machine of claim 1, wherein said urging means comprises a support having a portion disposed at a level beneath said traction member ahead of said bearing, as seen in said direction.

47. The machine of claim 1, wherein said urging means includes a support for said holder, said limiting means including at least one eccentric movably mounted on said support and follower means provided on said holder and tracking said eccentric.

48. The machine of claim 47, wherein said support includes arms flanking said path behind said traction member, as seen in said direction, said eccentric being provided on one of said arms and said follower means extending counter to said direction.

* * * * *